(12) United States Patent
Coulas et al.

(10) Patent No.: US 8,391,165 B2
(45) Date of Patent: Mar. 5, 2013

(54) METHOD AND APPARATUS FOR IDENTIFYING CALLER PREFERENCES MATCHED TO CALLEE CAPABILITIES FOR IMS COMMUNICATIONS

(75) Inventors: Michael F. Coulas, Buffalo Grove, IL (US); Bradley F. Jentz, Barrington, IL (US); Robert Horvath, Arlington Heights, IL (US)

(73) Assignee: Motorola Mobility LLC, Libertyville, IL (US)

( * ) Notice: Subject to any disclaimer, the term of this patent is extended or adjusted under 35 U.S.C. 154(b) by 1522 days.

(21) Appl. No.: 11/324,137

(22) Filed: Dec. 30, 2005

(65) Prior Publication Data
US 2007/0153777 A1 Jul. 5, 2007

(51) Int. Cl.
- *H04Q 7/22* (2006.01)
- *H04Q 7/20* (2006.01)
- *H04L 12/26* (2006.01)
- *H04L 12/66* (2006.01)
- *H04L 12/56* (2006.01)
- *H04W 36/00* (2009.01)
- *H04W 24/00* (2009.01)
- *H04W 60/00* (2009.01)
- *H04M 3/42* (2006.01)

(52) U.S. Cl. ............ 370/252; 370/395.2; 370/352; 370/353; 370/354; 370/356; 379/207.02; 379/201.01; 379/201.12; 455/414.4

(58) Field of Classification Search ........ 370/395.3, 370/310, 352–356, 252, 395.2; 379/207.02, 379/201.01, 201.12; 455/414.4
See application file for complete search history.

(56) References Cited

U.S. PATENT DOCUMENTS

| | | | |
|---|---|---|---|
| 7,583,685 B2 * | 9/2009 | Ajitomi et al. | 370/401 |
| 7,599,347 B2 * | 10/2009 | Wang | 370/349 |
| 7,676,548 B2 * | 3/2010 | Oh et al. | 709/208 |
| 7,830,823 B2 * | 11/2010 | Holloway et al. | 370/260 |
| 2004/0223489 A1 | 11/2004 | Rotsten et al. | |
| 2004/0225679 A1 * | 11/2004 | Oran | 707/104.1 |
| 2004/0225878 A1 | 11/2004 | Costa-Roquena et al. | |
| 2004/0249951 A1 | 12/2004 | Grabelsky et al. | |
| 2005/0165913 A1 * | 7/2005 | Coulombe et al. | 709/219 |
| 2005/0245241 A1 | 11/2005 | Durand et al. | |

(Continued)

OTHER PUBLICATIONS

Rosenberg, Obtaining and using Global Routable User Agent (UA) URIs (GRUU) in the Session Initiation Protocol (SIP), The Internet Society, Feb. 21, 2005.

(Continued)

*Primary Examiner* — Chandrahas Patel
*Assistant Examiner* — Wutchung Chu
(74) *Attorney, Agent, or Firm* — Ingrassia Fisher & Lorenz, P.C.

(57) ABSTRACT

Multimedia IMS communications are established by matching callee capabilities with caller preferences and identifying a URI parameter in response thereto. When a session initiation protocol (SIP) request identifying caller preferences for an internet communication session and an identified callee is received (602), a determination is made of whether the identified callee is a registered address of record (AOR) or not (604). If the identified callee is a registered AOR (604), a uniform resource identifier (URI) parameter and a globally routable user agent URI (GRUU) associated with callee capabilities are identified (608, 612, 614). The URI parameter is used to create a modified SIP including the URI parameter (616) for sending (618) to an IMS enabled wireless communication device (120).

15 Claims, 7 Drawing Sheets

U.S. PATENT DOCUMENTS

| | | | |
|---|---|---|---|
| 2006/0004924 A1* | 1/2006 | Trossen | 709/228 |
| 2006/0018272 A1* | 1/2006 | Mutikainen et al. | 370/328 |
| 2006/0067244 A1* | 3/2006 | Sekaran et al. | 370/252 |
| 2006/0165060 A1* | 7/2006 | Dua | 370/352 |
| 2006/0239247 A1* | 10/2006 | Postmus | 370/352 |
| 2007/0002831 A1* | 1/2007 | Allen et al. | 370/352 |
| 2007/0011342 A1* | 1/2007 | Rosenberg | 709/230 |

OTHER PUBLICATIONS

Rosenberg, Indicating User Agent Capabilities in the Session Initiation Protocol (SIP), The Internet Society, Aug. 2004.

Rosenberg, Caller Preferences for the Session Initiation Protocol (SIP), The Internet Society, Aug. 2004.

International Search Report PCT/US06/49308 dated Sep. 23, 2008.

* cited by examiner

METHOD AND APPARATUS FOR IDENTIFYING CALLER PREFERENCES MATCHED TO CALLEE CAPABILITIES FOR IMS COMMUNICATIONS

FIELD OF THE INVENTION

The present invention generally relates to portable communication systems, and more particularly relates to a method and apparatus in internet protocol (IP) multimedia subsystem (IMS) communications to match caller preferences with callee capabilities and provide identification thereof.

BACKGROUND OF THE INVENTION

Today's wireless communication systems provide a multitude of functions in addition to traditional mobile telephone communications, such as providing internet access and email service for mobile devices operating in such portable communication systems. Third generation (3G) portable communication protocols, such as wideband CDMA (WCDMA) or CDMA2000, support internet protocol (IP) multimedia subsystem (IMS) communications. While a mobile device using IMS is limited to a single local IP address and server port that is associated with a specific Private User Identity (Private ID), the single secure IMS connection can be used to support a multitude of services implemented by numerous User Agents (UA) all executing on the same mobile device, where a UA is an application which uses the IMS connection in association with a Session Initiation Protocol (SIP). Unfortunately, when an IMS request is received outside of a session or dialogue, it may not be immediately clear to which UA the request is targeted. Consequently, a complicated algorithm based on message contents (e.g., method, feature tags, body, etc.) may be required to resolve the UA destination of the IMS request within the mobile device.

For mobile devices which support globally routable user agent uniform resource identifiers (GRUUs), a different GRUU can be registered for each of the UAs using a specific IMS connection. While mechanisms for matching caller preferences contained in incoming SIP requests to registered callee preferences in order to determine a target contact address currently exist, even if the SIP request is found to match a specific registered GRUU, possibly one of a set of GRUUs all bound to the same contact address, there is currently no means of indicating the selected GRUU to the mobile device. One proposal is to use a new SIP URI parameter that a mobile device may add to a GRUU for the purpose of identifying it. This parameter is opaque to the proxy server handling the domain. However, when the server maps the GRUU to the contact bound to it, the server will copy the grid parameter into the contact. As a result, when the UA receives the request, the Request URI will contain the grid parameter it placed in the corresponding GRUU. This mechanism can only be used to identify the GRUU to which a SIP message was explicitly addressed (i.e., SIP request addressed to a GRUU instead of an Address of Record (AOR)). It cannot be used to identify the GRUU that was selected as a result of the network matching caller preferences to registered callee capabilities (i.e., SIP request addressed to an AOR).

Thus, what is needed is a method and apparatus for IMS to include in a SIP request addressed to an AOR and received outside of a dialog, an indication of the GRUU that was selected as a result of matching caller preferences with callee capabilities so that, upon receiving the request, an IMS terminal can use the indicated GRUU to easily route the SIP request to the targeted UA. Furthermore, other desirable features and characteristics of the present invention will become apparent from the subsequent detailed description of the invention and the appended claims, taken in conjunction with the accompanying drawings and this background of the invention.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

A method and apparatus for establishing multimedia IMS communications matches callee capabilities with caller preferences. When a session initiation protocol (SIP) request identifying caller preferences for an internet communication session and an identified callee is received, a determination is made of whether the identified callee is a registered address of record (AOR) or not. If the identified callee is a registered AOR, a uniform resource identifier (URI) parameter and a globally routable user agent URI (GRUU) associated with callee capabilities are identified. The URI parameter is used to create a modified SIP request including the URI parameter for sending to an IMS enabled wireless communication device.

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
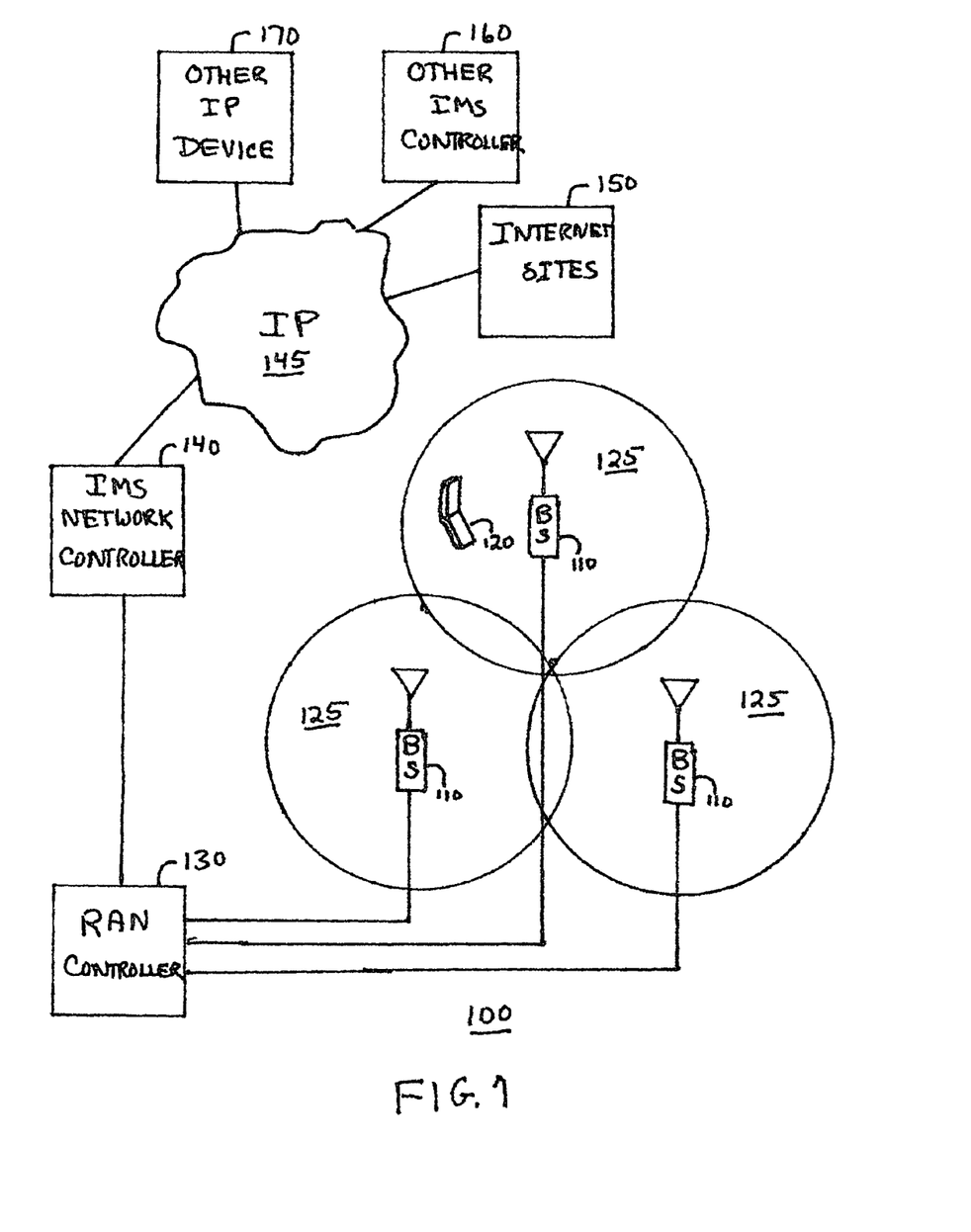
FIG. 1 is a block diagram of a wireless communication system in accordance with an embodiment of the present invention.

Referring to FIG. 1, a wireless communication system 100 in accordance with an embodiment of the present invention includes a plurality of base stations 110 and a wireless communication device 120. The plurality of base stations 100 communicate with the wireless communication device 120 via radio frequency (RF) signals. Associated with each of the plurality of base stations 110 is a coverage area 125 wherein the wireless communication device 120 can receive signals from and transmit signals to such one of the plurality of base stations 110.

The plurality of base stations 110 are coupled to a radio access network controller 130 for control of communications in the wireless communication system 100. In accordance with the present invention, the radio access network controller 130 is coupled to an internet protocol (IP) multimedia subsystem (IMS) network controller 140. The IMS network controller 140 is an internet server for control of IMS communications between the radio access network and the internet 145. For example, the wireless communication device 120 could access an internet site 150 through the IMS network controller 140. In addition, the IMS controller 140 could establish and maintain communications with another IMS communication system by coupling to another IMS controller 160 or could couple to any of a number of other IP devices 170 for establishing and maintaining an IMS communication session.

Figure 2:
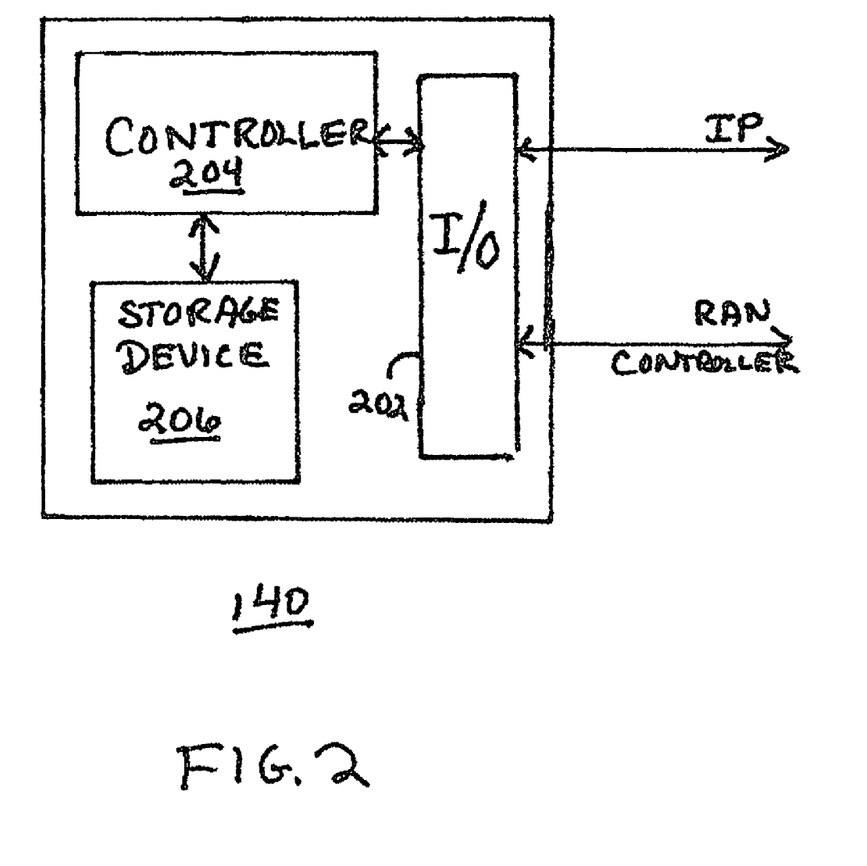
FIG. 2 is a block diagram of an internet protocol (IP) multimedia subsystem (IMS) network controller of the communication system of FIG. 1 in accordance with the embodiment of the present invention.

Referring to FIG. 2, the IMS network controller 140 includes an input/output handler 202 for controlling the flow of information to and from a controller 204. The controller 204 performs the functions of the IMS network controller 140 and is coupled to a storage device 206 for storing information therein and for retrieving information therefrom to perform the functions of the IMS network controller. In accordance with the present invention, the storage device 206 maintains a database of registered addresses of record (AORs), i.e., wireless communication devices 120 registered to participate in IMS communication sessions, and the controller 204 performs registration of the AORs and initiates and maintains IMS communication sessions in accordance with the embodiment of the present invention.

Figure 3:
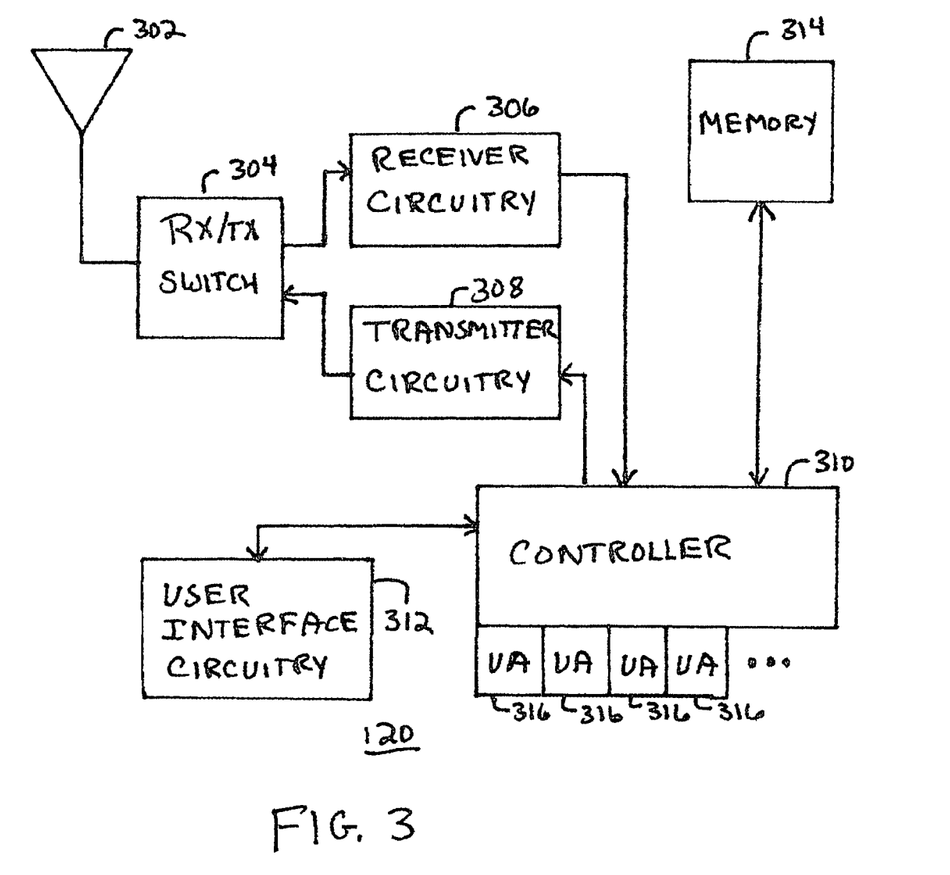
FIG. 3 is a block diagram of a wireless communication device of the communication system of FIG. 1 in accordance with the embodiment of the present invention.

Referring to FIG. 3, a wireless communication device 120 in accordance with the embodiment of the present invention is shown. The wireless communication device 120 includes an antenna 302 for receiving and transmitting radio frequency (RF) signals. A receive/transmit switch 304 selectively couples the antenna 302 to receiver circuitry 306 and transmitter circuitry 308 in a manner familiar to those skilled in the art. The receiver circuitry 306 demodulates and decodes the RF signals to derive information therefrom and is coupled to a controller 310 for providing the decoded information thereto for utilization thereby in accordance with the function(s) of the wireless communication device 120. The controller 310 also provides information to the transmitter circuitry 308 for encoding and modulating information into RF signals for transmission from the antenna 302.

The controller 310 is coupled to user interface circuitry 312 including, for example, a display for presenting video output to a user, user controls, such as a keypad, for receiving user input thereon, a microphone for receiving voice input, and a speaker for providing audio output to the user as is known to those skilled in the art. The controller 310 is further coupled to a memory device 314 for storing information therein and for retrieving and utilizing information therefrom.

The wireless communication device 120 can communicate with other wireless communication devices 120 in the radio access network managed by the radio access network controller 130. In addition, the wireless communication device 120, in accordance with the embodiment of the present invention, is an IMS-enabled wireless communication device 120 and can register to participate in multimedia IP communication sessions, such as IMS communication sessions, and communicate in such sessions via the IMS network controller 140 (FIG. 1). For IMS communications, the controller 310 couples to any of a plurality of user agents (UAs) 316 for performing IP operations. UAs 316 are applications which can facilitate IP communications in accordance with the session initiation protocols (SIP). As a participant in IMS communication sessions, the controller 310 can access one of the UAs 316, each of the UAs 316 having predefined UA capabilities.

For IP communications, globally routable UA URIs (GRUUs) are registered for each IP UA using a specific IP connection and/or port. The IMS-enabled wireless communication device 120 supports the use of GRUUs that can be registered using feature tags describing the callee capabilities of the associated UA. IMS communications, however, restrict a wireless communication device 120 to IP communication access across a single port, regardless of how many UAs may be supported by the IMS-enabled wireless communication device 120. Thus, in accordance with the present invention, the UAs have, in addition to the associated GRUU, a uniform resource identifier (URI) parameter associated therewith. A URI is an Internet Protocol (IP) element consisting of a short string of characters conforming to a certain syntax. A URI parameter associated with one of the UAs comprises an identifier that can be used to refer to the VA. In accordance with the embodiment of the present invention, the EMS-enabled wireless communication device 120 supports the use of GRUUs that can be registered using feature tags describing the callee capabilities of the associated UA.

Figure 4:
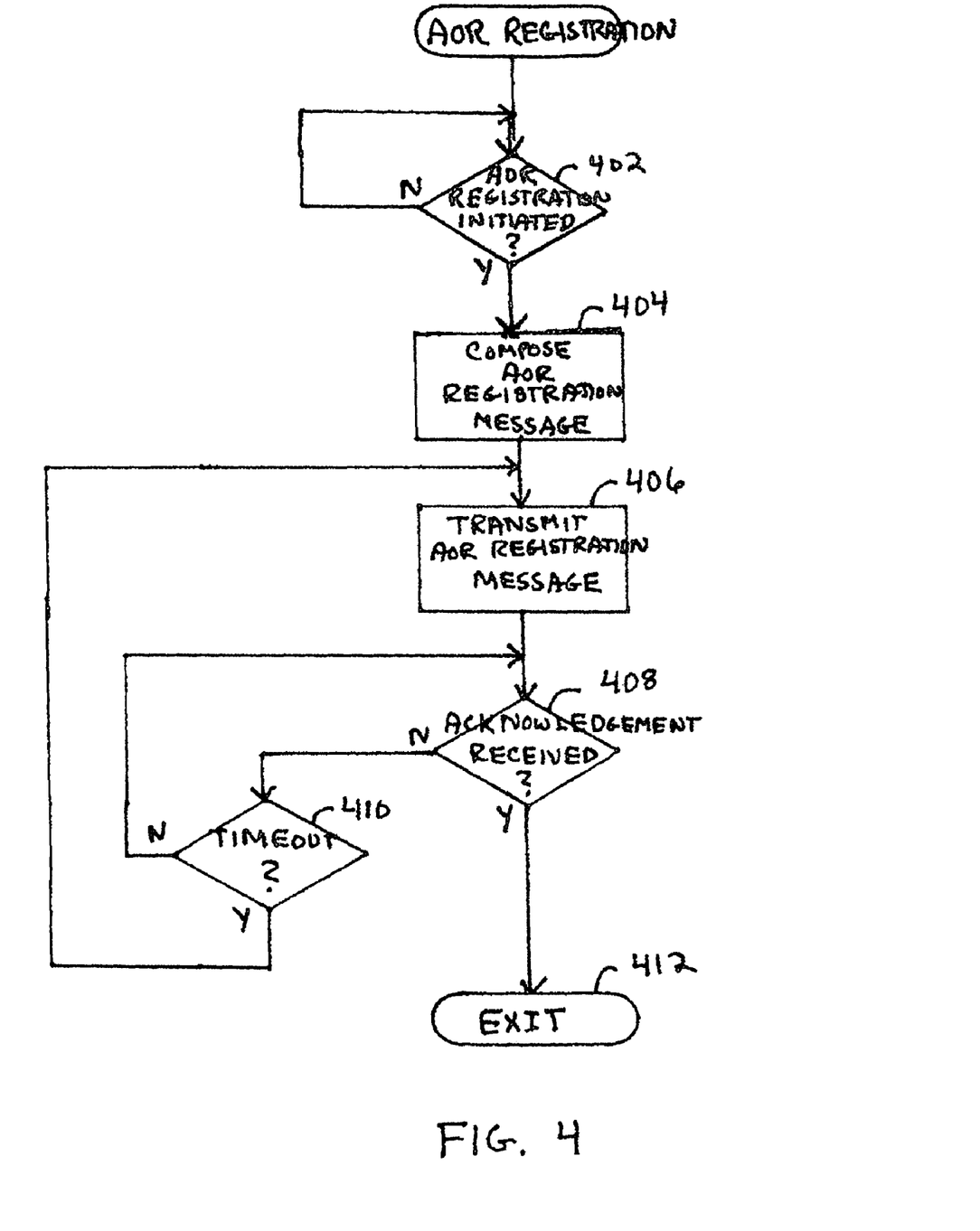
FIG. 4 is a flowchart of the user agent (UA) registration operation of the wireless communication device of FIG. 3 in accordance with the embodiment of the present invention.

Prior to participating in an IMS communication session, the wireless communication device 120 must first register with the IMS network controller 140 as a registered address of record (AOR). A flowchart of the registration process at the wireless communication device 120 is shown in FIG. 4. The AOR registration process is initiated 402 by the controller 310. It could be initiated by the controller 310 recognizing reception of a user EMS registration input 402 from the user interface circuitry 312 or could be caused by a timeout in the processing of the controller 310 which initiates a refreshing of the registration automatically with no user interaction. In response to receiving the user IMS registration input 402, the controller 310 composes a registration message 404. The AOR registration message includes a header indicating that the wireless communication device 120 can support GRUUs and UA information identifying each of the UAs 316 of the wireless communication device 120. In addition, the AOR registration message includes, for each of the UAs, the (a) UA instance ID to be mapped to a GRUU, (b) a URI parameter as a part of the contact address to uniquely identify any SIP requests associated with this UA registration, and (c) the one or more UA capabilities thereof. Also, the registration message includes identifying information identifying the wireless communication device 120 or user as the sender of the AOR registration message. The identifying information could be an electronic serial number (ESN), a mobile equipment identifier (MEID), a public user ID, a private user ID, or other information uniquely identifying the wireless communication device 120 or user sending the registration message. After composing the AOR registration message 404, the controller 310 forwards the AOR registration message to the transmitter circuitry 308 for transmission of the AOR message 406 to the IMS network controller 140. The controller 310 then determines whether a registration acknowledgement message has been received 408 or a predefined waiting period has timed out 410. When the waiting period has timed out 410 with no acknowledgement message being received 408, processing returns to step 406 to retransmit the AOR registration message. When the registration acknowledgement message is received 408, the AOR registration process at the wireless communication device 120 is completed 412.

Figure 5:
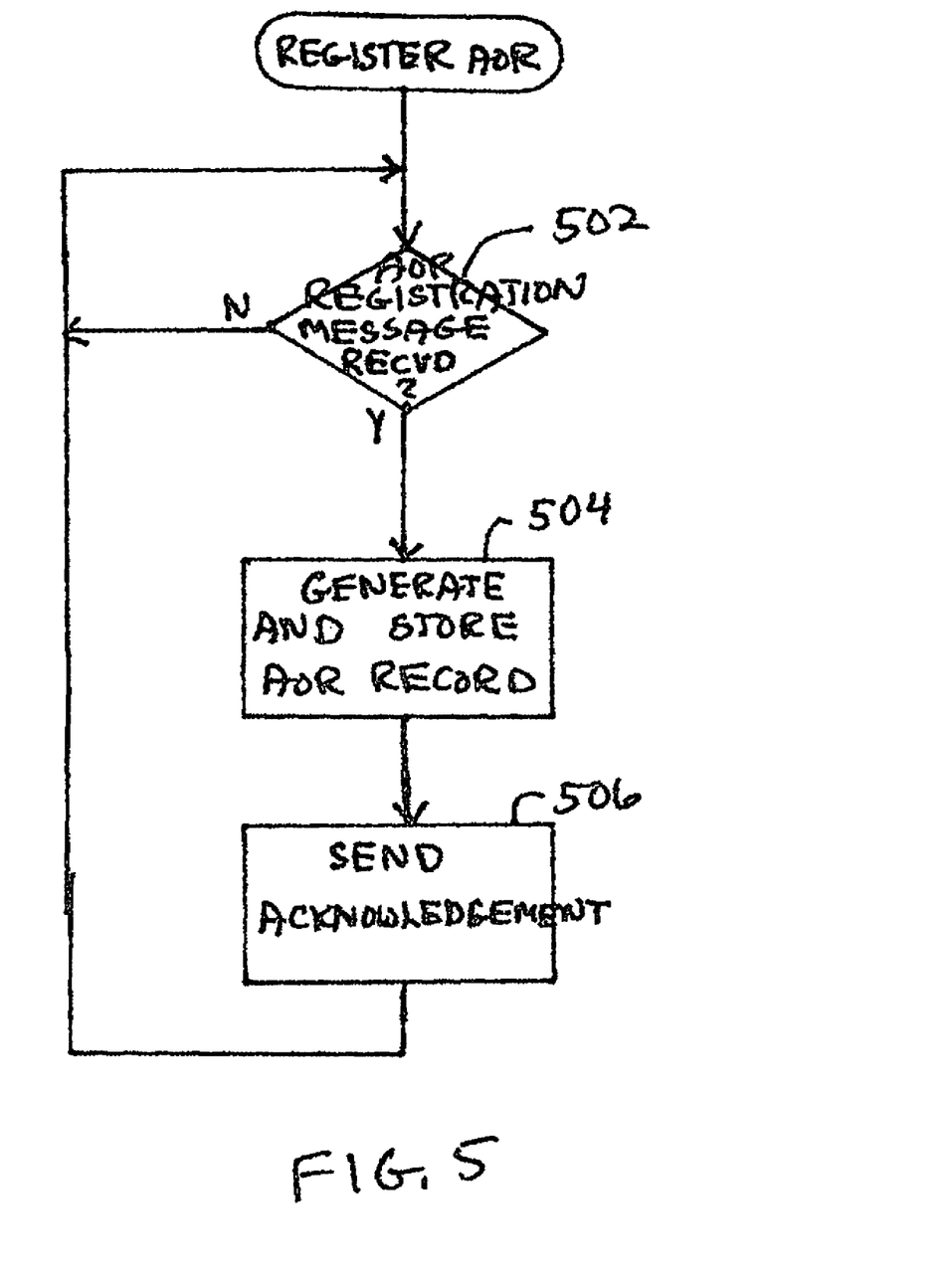
FIG. 5 is a flowchart of the user agent (UA) registration operation of the IMS network controller of FIG. 2 in accordance with the embodiment of the present invention.

Referring to FIG. 5, the AOR registration process at the IMS network controller 140 starts at step 502 where the controller 204 examines information at the input/output handler 202 to determine if an AOR registration message has been received 502 from the radio access network controller 130. When the registration message is received 502, the controller stores an AOR record for the newly registered AOR 504 in the storage device 206. The AOR record, will include the identifying information identifying the sender of the registration message, one or more UAs and, for each UA, an associated GRUU created by the network controller 204, an associated URI parameter, and one or more UA capabilities. The UA capabilities are stored as callee capabilities, i.e., the capabilities that a callee can support in a multimedia IMS communication session. After the AOR record is stored 504, the controller 204 provides an acknowledgement message 506, including the identifying information, to the input/output handler for transmission to the wireless communication device 120 that sent the AOR registration message. Processing then returns to await reception of the next AOR-registration message 502.

Figure 6:
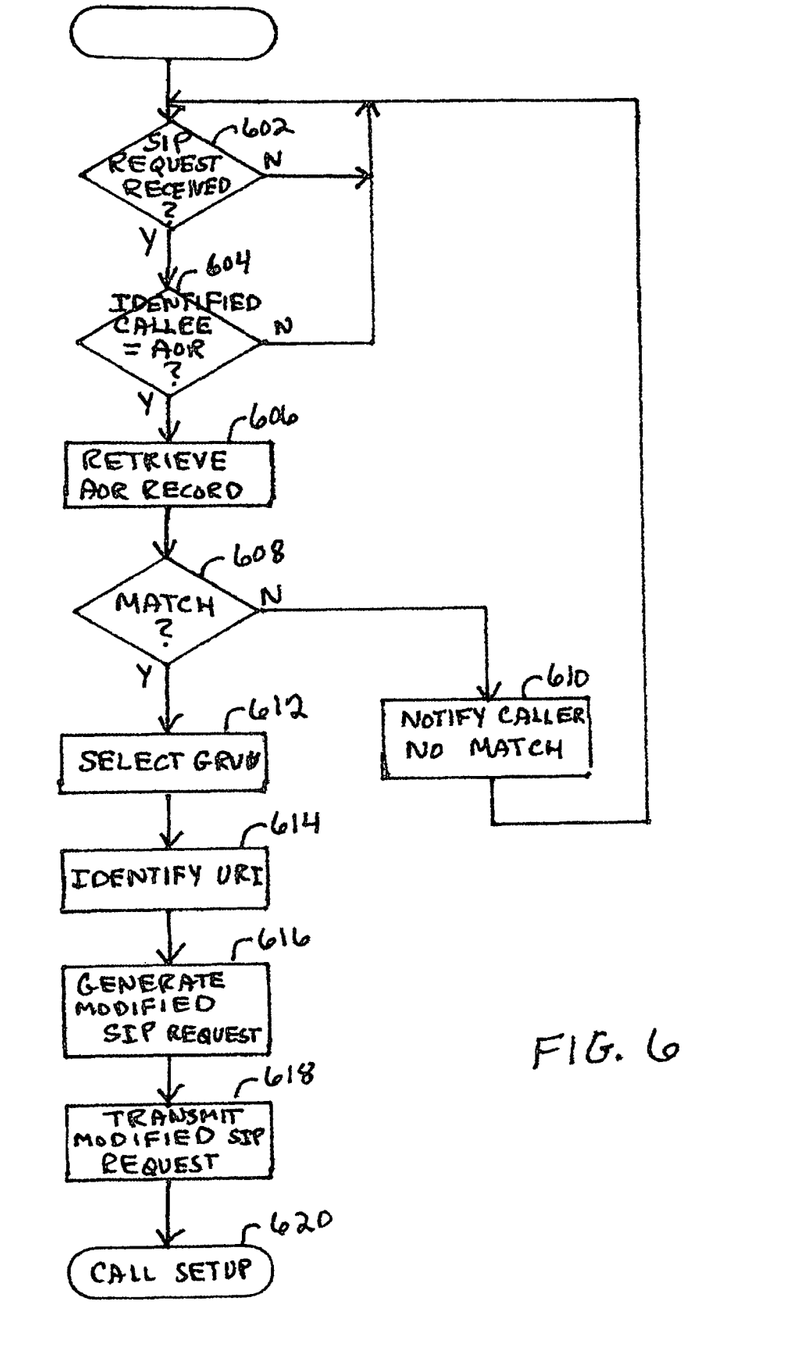
FIG. 6 is a flowchart of the caller preference to user capability matching operation of the IMS network controller of FIG. 2 in accordance with the embodiment of the present invention.

In accordance with the embodiment of the present invention, prior to establishing an IMS communication session, the controller 204 of the IMS network controller 140, in a call setup routine, matches caller preferences from the caller wishing to establish the communication session to callee capabilities of an identified callee (i.e., an AOR identified by the caller) so that the appropriate UA can be utilized by the AOR/wireless communication device 120 for IP communication in the IMS communication session. Referring to FIG. 6, the call setup routine at the controller 204 initially awaits reception of a session initiation protocol (SIP) request 602.

SIP is an IP control protocol that can establish, modify and terminate multimedia sessions or calls, such as multimedia conferences, distance learning, Internet telephony and similar applications. SIP supports different facets of establishing and terminating multimedia communications such as determination of the media and media parameters (e.g., the UA and UA parameters) and establishment of call parameters at both the caller and callee. In accordance with the present invention, the SIP request includes caller preferences for an IMS communication session and an identified callee.

When the SIP request is received 602, the controller 204 determines whether the identified callee is a registered AOR 604. If the identified callee is a registered AOR 604, the controller 204 retrieves the AOR record 606 from the storage device 206 and determines whether there are callee capabilities registered by the AOR matching the caller preferences specified in the SIP request to 608. If there are no matching callee capabilities 608, the controller 204 sends a message notifying the caller that the identified callee does not have callee capabilities matching the caller preferences 610 and processing returns to await reception of the next SIP request 602.

The IMS network controller 140 supports establishing IMS communication sessions by using GRUUs to identify the UAs for IP communication. Thus, the controller 204, by matching caller preferences specified in the SIP request to callee capabilities registered by the AOR 608, selects the GRUU the SIP request is actually targeted to (i.e., which UA the SIP request is targeted to). So, when callee capabilities matching the caller preferences have been identified 608, the GRUU associated with the UA having the matching callee capabilities is selected 612 and the URI parameter in the AOR record associated with the selected GRUU is identified 614. The controller 204 next generates a modified SIP request 616 which replaces the AOR specified in the SIP request with a contact address with the identified URI parameter, and transmits the modified SIP request 618 by providing the modified SIP request to the input/output handler 202 for transmission to the wireless communication device 120. Processing then proceeds to a standard call setup routine 620.

Figure 7:
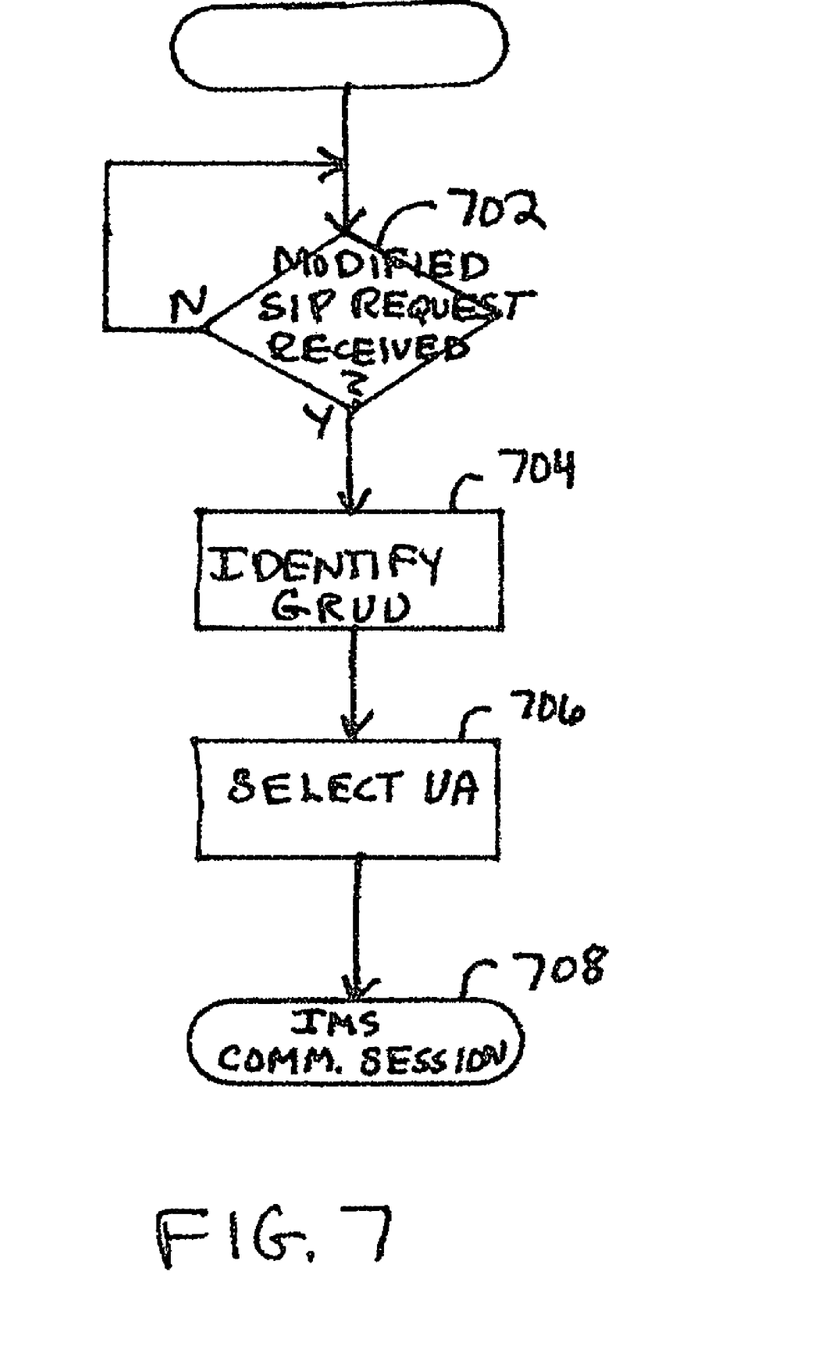
FIG. 7 is a flowchart of the caller preference to user capability matching operation of the wireless communication device of FIG. 3 in accordance with the embodiment of the present invention.

Referring to FIG. 7, the call setup routine at the controller 310 of the wireless communication device 120 initially awaits reception of a modified SIP request 702. When the modified SIP request is received 702, the GRUU associated with the URI parameter of the received modified SIP request is identified 704 and one of the UAs 316 is selected for the IMS communication session in response to the identified GRUU 706. Processing then proceeds to establish the IMS communication session 708 in a manner known to those skilled in the art.

Thus it can be seen that the present invention overcomes the disadvantages of the prior art in that GRUUs, which can be utilized to establish IP communication where an identified callee (e.g., terminal) has multiple IP connections or ports for accommodating multiple GRUUs, can also be utilized to establish IP communication with an IMS terminal (such as a wireless communication device 120) which can only utilize one IP connection and/or port. The present invention advantageously utilizes URI parameters associated with each GRUU of an IMS-enabled wireless communication device 120 to identify the targeted UA in the modified SIP request.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A method for identifying caller preferences matched with callee capabilities to establish an internet communication session, the method performed by an internet protocol (IP) multimedia subsystem (IMS) network controller and comprising the steps of:

receiving, from a caller, a session initiation protocol (SIP) request that includes caller preferences for an internet communication session and an identified callee;

determining whether the identified callee included in the SIP request is a registered address of record (AOR);

when the identified callee is a registered AOR, determining whether there are stored callee capabilities associated with the registered AOR that match the caller preferences specified in the SIP request;

when there are callee capabilities that match the caller preferences, identifying uniform resource identifier (URI) parameters and a globally routable user agent URI (GRUU) associated with those of the callee capabilities that match the caller preferences, wherein the GRUU corresponds to one of multiple user agents (UA) that are executable by the callee, wherein the multiple UAs have predefined capabilities; and generating and forwarding a modified SIP request to the caller, the modified SIP request including the URI parameters associated with the GRUU instead of the identified callee specified in the SIP request.

2. The method of claim 1 wherein the step of identifying the URI parameters and GRUU comprises the steps of:

retrieving callee capabilities and GRUUs associated therewith for the identified callee in response to determining that the identified callee is a registered AOR for internet communications;

determining whether there is a match between the callee capabilities for the registered AOR and the caller preferences of the received SIP request;

identifying the URI parameters associated with the callee capabilities matching the caller preferences of the received SIP request in response to determining that there is a match between the callee capabilities for the registered AOR and the caller preferences of the SIP request; and selecting the GRUU associated with the callee capabilities matching the caller preferences of the received SIP request.

3. The method of claim 2 further comprising the steps of:

receiving a registration message from a sender, the registration message comprising UA information identifying the multiple UAs of the sender, one or more instance IDs, and the URI parameters, each of the one or more instance IDs associated with one of the multiple UAs, and each of the URI parameters associated with one of the one or more instance IDs;

creating the multiple GRUUs, each of the multiple GRUUs assigned to each of the one or more instance IDs; and storing the multiple GRUUs, the one or more instance IDs, and the URI parameters associated therewith along with a callee identifier identifying the sender as an AOR.

4. The method of claim 3 wherein the registration message further includes one or more callee capabilities associated with each of the multiple UAs, and wherein the step of determining whether there is a match between the callee capabilities for the AOR and the caller preferences of the received SIP request comprises the step of determining whether there is one of the multiple UAs having callee capabilities associated therewith that match the caller preferences of the SIP request, and wherein the step of selecting the GRUU associated with the callee capabilities comprises the steps of:

identifying one of the multiple GRUUs that is associated with the one of the multiple UAs having callee capabilities associated therewith that match the caller preferences of the SIP request as the GRUU associated with the callee capabilities matching the caller preferences of the received SIP request; and identifying the one or more URI parameters associated with the selected GRUU.

5. The method of claim 1 wherein the IMS network controller is for establishing an IMS communication session.

6. The method of claim 3 wherein the sender is a wireless communication device operating in a wireless communication system, and wherein the IMS network controller is for establishing an IMS communication session, the IMS network controller coupled to the wireless communication system.

7. A method performed in a wireless communication device that includes multiple user agents (UAs) that may be executed during an IMS communication session to be established by an internet protocol (IP) multimedia subsystem (IMS) network controller, the method comprising the steps of:

composing a registration message comprising identifying information identifying a sender of the registration message, UA information identifying each of the multiple UAs of the wireless communication device, one or more UA capabilities associated with each of the multiple UAs, one or more uniform resource identifier (URI) parameters, and one or more instance IDs, each of the one or more instance IDs associated with one of the one or more URI parameters and one of the multiple UAs;

transmitting the registration message to the IMS network controller for registration therewith as an address of record (AOR);

transmitting a session initiation protocol (SIP) request to the IMS network controller, which includes caller preferences for an internet communication session and an identified callee;

receiving, from the IMS network controller, a modified SIP request, which includes, in place of the identified callee specified in the SIP request, URI parameters associated with a globally routable user agent URI (GRUU) of the callee that match the caller preferences;

selecting a UA of the multiple UAs based on the GRUU included in the modified SIP request; and establishing an IMS communication session with the identified callee using the UA.

8. The method of claim 7 wherein the one or more UA capabilities associated with each of the multiple UAs comprise one or more feature tags for each of the multiple UAs.

9. An internet protocol (IP) multimedia subsystem (IMS) network controller comprising:

an input/output handler for receiving, from a caller, a session initiation protocol (SIP) request identifying caller preferences for an IMS communication session and an identified callee, and for sending a modified SIP request to the caller;

a storage device for storing address of record (AOR) information associated with one or more AORs, the AOR information including, for each of the one or more AORs, multiple globally routable user agent uniform resource identifiers (GRUUs) identifying multiple user agents (UAs) thereof; and a controller coupled to the input/output handler and the storage device, the controller for receiving the SIP request and determining whether the identified callee is an AOR having AOR information stored in the storage device and, when AOR information for the identified callee is stored in the storage device, identifying a GRUU corresponding to one of the multiple UAs of the AOR associated with callee capabilities matching the caller preferences identified in the received SIP request, and generating the modified SIP request for transmission by the input/output handler to the caller, the modified SIP request including a uniform resource identifier (URI) parameter that identifies the GRUU instead of the identified callee specified in the SIP request.

10. The IMS network controller of claim 9 wherein the storage device further stores one or more callee capabilities for each of the GRUUs stored therein, and wherein the controller identifies the GRUU by retrieving AOR information for an AOR in response to determining that the identified callee is an AOR having AOR information stored in the storage device, determining that there is a match between the callee capabilities for the AOR and the caller preferences of the received SIP request, and identifying the GRUU associated with the callee capabilities matching the caller preferences of the received SIP request.

11. The IMS network controller of claim 9 wherein the input/output handler receives a registration message from a wireless communication device and forwards the registration message to the controller, and wherein the controller decodes the registration message to generate a callee identifier corresponding to a sender of the registration message, multiple user agents (UAs) of the wireless communication device, and one or more instance IDs, each of the one or more instance IDs associated with one of the multiple UAs, and wherein the controller thereafter creates multiple GRUUs to the one or more instance IDs and provides the one or more instance IDs and the multiple GRUUs to the storage device for storage therein along with a callee identifier identifying the wireless communication device as an AOR.

12. The IMS network controller of claim 11 wherein the registration message further includes one or more callee capabilities associated with each of the multiple UAs, and wherein the controller decodes and provides to the storage device the one or more callee capabilities for storage therein, the one or more instance IDs, and the multiple GRUUs of the wireless communication device, and wherein the controller determines that there is a match between the callee capabilities for the AOR and the caller preferences of the received SIP request in response to determining that there is one of the multiple UAs having callee capabilities associated therewith that match the caller preferences of the SIP request, and wherein the controller identifies the GRUU associated with the callee capabilities by identifying the one of the multiple GRUUs that is associated with the one of the multiple UAs having the callee capabilities associated therewith that matches the caller preferences of the SIP request.

13. A wireless communication device comprising:

an antenna for receiving and transmitting radio frequency (RF) signals;

multiple user agents (UAs), wherein each of the multiple UAs has one or more UA capabilities for performing the operations thereof during an internet protocol (IP) multimedia subsystem (IMS) communication session;

a controller coupled to the multiple UAs, the controller composing and encoding a registration message for registering UA capabilities of the wireless communication device with an IMS network controller, the registration message comprising identifying information identifying the wireless communication device or user and the capability of the wireless communication device to utilize globally routable user agent uniform resource identifier (GRUUs), UA information identifying the multiple UAs of the wireless communication device, one or more UA capabilities associated with each of the multiple UAs, and one or more instance IDs generated by the controller, each of the one or more instance IDs associated with one of the multiple UAs, and wherein the controller further composes a session initiation protocol (SIP) request that includes caller preferences for an internet communication session and an identified callee, and wherein the controller further receives, from the IMS network controller in response to the SIP request, a URI parameter corresponding to a GRUU of the callee, and the controller further establishing an IMS connection for an IMS communication session in response to receiving the URI parameter, the controller coupling a UA of the multiple UAs to the IMS connection, wherein the controller selects the UA in response to the received URI parameter; and transmitter circuitry coupled to the antenna and the controller, the transmitter circuitry receiving the registration message and the SIP request from the controller, modulating the registration message and the SIP request and providing the modulated registration message and the modulated SIP request to the antenna for transmission therefrom as RF signals.

14. The wireless communication device of claim 13 wherein the one or more UA capabilities associated with each of the multiple UAs comprise one or more feature tags for each of the multiple UAs.

15. The wireless communication device of claim 13 further comprising a receiver coupled to the antenna for receiving and demodulating RF signals, the receiver further coupled to the controller for providing the demodulated RF signals thereto, and wherein the receiver receives the URI parameter and provides the URI parameter to the controller, the URI parameter included in a modified SIP request.

* * * * *